United States Patent
Sandrew

(10) Patent No.: US 8,179,475 B2
(45) Date of Patent: May 15, 2012

(54) APPARATUS AND METHOD FOR SYNCHRONIZING A SECONDARY AUDIO TRACK TO THE AUDIO TRACK OF A VIDEO SOURCE

(75) Inventor: Barry B. Sandrew, San Diego, CA (US)

(73) Assignee: Legend3D, Inc., San Diego, CA (US)

( * ) Notice: Subject to any disclaimer, the term of this patent is extended or adjusted under 35 U.S.C. 154(b) by 1436 days.

(21) Appl. No.: 11/684,460

(22) Filed: Mar. 9, 2007

(65) Prior Publication Data

US 2008/0219637 A1    Sep. 11, 2008

(51) Int. Cl.
*H04N 5/932* (2006.01)
(52) U.S. Cl. ........................ 348/515; 386/201
(58) Field of Classification Search .............. 386/285, 386/201–204, 207; 348/512, 515, 510
See application file for complete search history.

(56) References Cited

U.S. PATENT DOCUMENTS

| | | | | |
|---|---|---|---|---|
| 4,758,908 A * | 7/1988 | James | ............................ | 360/61 |
| 5,055,939 A * | 10/1991 | Karamon et al. | ............ | 386/201 |
| 5,880,788 A * | 3/1999 | Bregler | ........................ | 348/515 |
| 6,184,937 B1 * | 2/2001 | Williams et al. | ............ | 348/515 |
| 6,737,957 B1 * | 5/2004 | Petrovic et al. | ............ | 340/5.86 |
| 7,117,231 B2 * | 10/2006 | Fischer et al. | ........................ | 1/1 |
| 7,333,519 B2 * | 2/2008 | Sullivan et al. | ............... | 370/517 |
| 7,343,082 B2 * | 3/2008 | Cote et al. | ..................... | 386/285 |
| 7,461,002 B2 * | 12/2008 | Crockett et al. | ............. | 704/278 |
| 7,624,337 B2 * | 11/2009 | Sull et al. | ...................... | 715/201 |
| 2005/0188297 A1 * | 8/2005 | Knight et al. | ............. | 715/500.1 |
| 2006/0274905 A1 * | 12/2006 | Lindahl et al. | ................. | 381/61 |
| 2007/0260634 A1 * | 11/2007 | Makela et al. | ............ | 707/104.1 |
| 2008/0044155 A1 * | 2/2008 | Kuspa | ............................ | 386/52 |
| 2008/0079851 A1 * | 4/2008 | Stanger et al. | ................ | 348/575 |
| 2008/0147917 A1 * | 6/2008 | Lees et al. | ...................... | 710/52 |
| 2008/0162577 A1 * | 7/2008 | Fukuda et al. | ............ | 707/104.1 |

FOREIGN PATENT DOCUMENTS

JP    2003-046982    *   2/2003

* cited by examiner

*Primary Examiner* — David Harvey
(74) *Attorney, Agent, or Firm* — ARC IP Law, PC; Joseph J. Mayo

(57) ABSTRACT

Synchronizes a secondary audio track to a video. Analyzes the audio track of a video using audio frequency analysis or spectrograms to find distinct audio events from which to ensure synchronization of a secondary audio track. For example, commentary that mocks a character may be played immediately after a particular noise in the audio track of a video occurs such as a door slam. Keeping the secondary audio track in synch with the audio track of a video is performed by periodically searching for distinct audio events in the audio track of a video and adjusting the timing of the secondary audio track. May utilize a sound card on a computer to both analyze a DVD sound track and play and adjust timing of the secondary audio track to maintain synchronization. Secondary audio tracks may be purchased and/or downloaded and utilized to add humorous external commentary to a DVD for example.

14 Claims, 5 Drawing Sheets

401 — .door slam   10020,300   freq=200-800,1200-1420 ampl>82

402 — shout 18202,382 freq=4500-5200, ... ampl>89

403 — "It is alive" 22383,522 freq=300-8000, ..., ampl > 92

APPARATUS AND METHOD FOR SYNCHRONIZING A SECONDARY AUDIO TRACK TO THE AUDIO TRACK OF A VIDEO SOURCE

BACKGROUND OF THE INVENTION

1. Field of the Invention

Embodiments of the invention described herein pertain to the field of audio/video synchronization systems. More particularly, but not by way of limitation, one or more embodiments of the invention enable an apparatus and method for synchronizing an secondary audio track to the audio track of a video source for example.

2. Description of the Related Art

There is no known apparatus or method for automatically synchronizing a secondary audio track to an audio track of a video source. There are various ways to manually perform synchronization between two audio streams that involve synching the two audio sources based on time (which may be running at a slightly different rate in each source), frame count or I frames in the case of MPEG. However, there is often drift of synch between the two sources. This is particularly evident in the case of DVD players which vary slightly in speed and other factors inherent in the multitude of player models as well as the form of compression and parameters of the DVD or other source. Indeed a secondary source might include various versions that were created using different compression codecs each with slightly different timing.

There are at least two ways to utilize a secondary audio track with a video source such as a DVD. First, the secondary audio track can be played separately from the DVD (for example a rented DVD) and adjusted manually while playing the secondary audio track, for example on an MP3 player coupled with speakers. This requires adjusting the playback of the secondary audio track to keep the secondary audio track in synchronization with the DVD that is playing. If the DVD is paused, the secondary audio track must be paused at the same time and both sources must be started again at the same time when resuming play. Synchronization, may be slightly off when resuming play, so the secondary audio track timing must be adjusted again to ensure synchronization.

The second manner in which to utilize a secondary audio track with a video source requires combining the secondary audio track with the audio track of the video source. The current process for combining a secondary audio track with a video source such as a DVD is an extremely technical manual process. The process requires several software tools to perform the required steps. For example, one scenario begins when a DVD is purchased by a user. The user decides to add humorous commentary to the DVD. The commentary is obtained from "RiffTrax.com" a company that specializes in secondary audio track generation and features commentary tracks from the original writers of "Mystery Science Theatre 3000". The DVD is "ripped" with "DVD Decrypter" or "rejig". The audio from the DVD is adjusted with "delaycut". The DVD Audio files are converted to WAV files with "PX3Convert". The WAV files are manually synched using "Audacity" with a secondary audio track, i.e., the "Riff Track". The resulting WAV file is converted with "ffmpeg-GUI" back to DVD format audio (i.e., AC3). The DVD format audio is added to the DVD video and converted to a single file with "Ifoedit" or "rejig". The single file is then burned onto a DVD with "DVDShrink".

The forementioned steps each break down into a very technical sub-steps. For example, ripping the files using "rejig" requires the following sub-steps. First, a folder is created on the user's desktop where the work will be performed. After creating the folder, the user inserts the DVD into the computer. The "rejig" program is run. The "rejig" setting are set to "IFO Mode" in the "Settings" and "old engine" is selected. The AC3 Delay box is checked along with any desired foreign language or subs. The output directory folder is selected. Next the "ChapterXtractor" is asserted which obtains the chapter times for the DVD. The user is required to edit the chapter times to remove "chapter 1=", "chapter 2=", etc., from the front of each line of the output file leaving one number per line. The one number per line represents the time offsets to each chapter in numeric format. The synchronizing step using "Audacity" uses the following sub-steps. Both the secondary audio track and the audio track of the video are loaded into "Audacity". The secondary audio track is then cut until the start of the movie lines up with the proper starting point of the secondary audio as indicated in a README file supplied with the secondary audio track. The amount of time to cut is approximate and is used a guideline to obtain a good first cut at synchronization. The sound level of the secondary audio track is adjusted to make sure that it is loud enough for simultaneous playback with the audio track of the video. The process of cutting away or adding time to the secondary audio continues throughout the playing of the video and is checked for synchronization every few minutes to ensure synchronization is correct. When synchronization is off, the secondary audio track timing is adjusted either by advancing or delaying the secondary audio track, or by slowing down or speeding up the secondary audio track. Although two steps of the main process have been described in more detail, the other steps not broken into sub-steps likewise have many pitfalls and are "expert friendly" at best.

As discussed, the technical competency required to create a "riffed DVD" is extremely high. Certain users have found that running alternate tools such as "Delaycut" must be utilized even if the ac3 file indicates a delay of "0 msec". If using the "goldwave" plugin, then fade-in and fade-out time must be allowed for. These steps put the generation process out of reach for normal users. In addition, although tools such as "sharecrow" have planned features that allow for speeding up and slowing down individual sections of audio, the entire process itself is still manual and highly technical. Other users have reported problems with synchronization when their computers do not have adequate memory, hence having a very capable computer is another requirement for performing the process.

Although the technical competency required to create a "riffed DVD" is very high, the paramount problem is maintaining synchronization between the video and the secondary audio track. There are many reasons why the secondary audio track goes out of synchronization with the DVD.

One reason for loss of synchronization has to do with different versions of a particular movie. For example movies sold in certain countries are required to have scenes deleted, for example violent scenes removed. Hence, there are points through the video where the secondary audio track no longer synchs with the video. For example, the PAL version of the movie "The Matrix" sold in the United Kingdom has synching issues at the point where a main character becomes quite violent. Hence depending on where a DVD is sold, different secondary audio synchronization timings must be employed to synchronize with the remaining portion of the video.

Another reason for loss of synchronization has to do with "drift". Framerate is a main cause of drift related problems. This requires checking the video framerate to ensure no compression is utilized prior to synching and ensuring that the right file types are utilized. For example, if the secondary audio track synchs properly with the video when watching the video on another piece of hardware, then the synch issues are certainly related to one of the steps utilized when reauthoring on the PC. The authoring process is simply too complex with too many variables to allow for trivial synchronization. Another cause of drift has to do with certain DVD players running slightly slower or faster than at a standard rate. Hence no absolute time starting offsets can be utilized, since synchronization drifts while a video plays and must be adjusted throughout the video using the manual steps previously described.

Another reason for loss of synchronization has to do with ambiguous synchronization lines in the movie. For example, in the movie "the Fifth Element", the sixth synchronization line "You have one point on your license" is spoken twice in the movie, once by a computer voice and once by an actor's voice. This causes confusion among users attempting to add the secondary sound track to the video.

BRIEF SUMMARY OF THE INVENTION

Embodiments of the invention enable an apparatus and method for synchronizing a secondary audio track to the audio track of a video source for example. In one or more embodiments the secondary audio track is an MP3 that contains commentary, music or other audio. The video may be movie, news program, television series, advertisement or any other video source. In one or more embodiments, the video may be a DVD (or high definition DVD) and the secondary audio track may include commentary of a humorous nature. Any other type of audio may be utilized in the secondary audio track, e.g., sound effects. Control of the timing of play of the secondary audio track using embodiments of the invention allows for automatic synchronization between the secondary audio track and the audio track of the video.

Embodiments of the invention analyze the audio track of a video using audio frequency analysis or spectrograms to find distinct audio events from which to ensure synchronization of a secondary audio track. Audio events are not limited to the spoken word and hence voice recognition systems are but one form of audio analyzer that may be utilized with embodiments of the invention. For example, commentary that mocks a character may be played immediately after an audio event, e.g., particular noise in the audio track of a video occurs, such as a door slam. Keeping the secondary audio track in synch with the audio track of the video is performed by periodically searching for distinct audio events in the audio track of a video and adjusting the timing of the secondary audio track. The timing may be adjusted by advancing or delaying the play or speeding up or slowing down of the secondary audio track. Alternatively, the secondary audio track may be indexed to allow for event driven playback of portions of the secondary audio track after observing particular audio events.

Embodiments of the invention may utilize a sound card on a computer to both analyze a DVD sound track and play and adjust timing of the secondary audio track to maintain synchronization. Third party secondary audio tracks may be generated by a user or purchased and/or downloaded for example from "RiffTrax.com" for example and then utilized to add humorous external commentary to a video. Embodiments of the invention allow for bypassing the generation of a "riffed DVD" altogether as the apparatus is capable of synchronizing audio in real-time. Hence use of rented DVDs (or high definition DVDs) without generating a second DVD is thus enabled.

Other embodiments may utilized a microphone for example in external configurations where a computer or MP3 player with a microphone is utilized to play and synchronize the secondary audio track to the audio track of a video.

Embodiments of the invention utilize a timing module that alters the timing of the secondary audio track based on detected audio event times detected in the audio track of an associated video. The desired event time is compared to the detected audio event time for an audio event and the timing of the secondary audio track is altered based on the time difference to maintain synchronization. The timing may be altered by speeding up or slowing down the secondary audio track to drift the secondary audio track back into synchronization or alternatively or in combination, the secondary audio track may be advanced or delayed to achieve synchronization. The timing module may make use of the hardware previously described and is not limited to spoken word audio events.

Embodiments of the Method

In one or more embodiments, the timing module may make use of a timing list that details the desired audio events and time offsets thereof. The list may further include general sonogram parameters that detail the general shape of the sonogram, i.e., frequency range and amplitudes in any format that allows for the internal or external detection of audio events internal to a computer or external via a microphone for example.

BRIEF DESCRIPTION OF THE DRAWINGS

The above and other aspects, features and advantages of the present invention will be more apparent from the following more particular description thereof, presented in conjunction with the following drawings wherein:

FIG. 4 shows a desired audio event timing list.

DETAILED DESCRIPTION

An apparatus and method for synchronizing a secondary audio track to the audio track of a video source will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
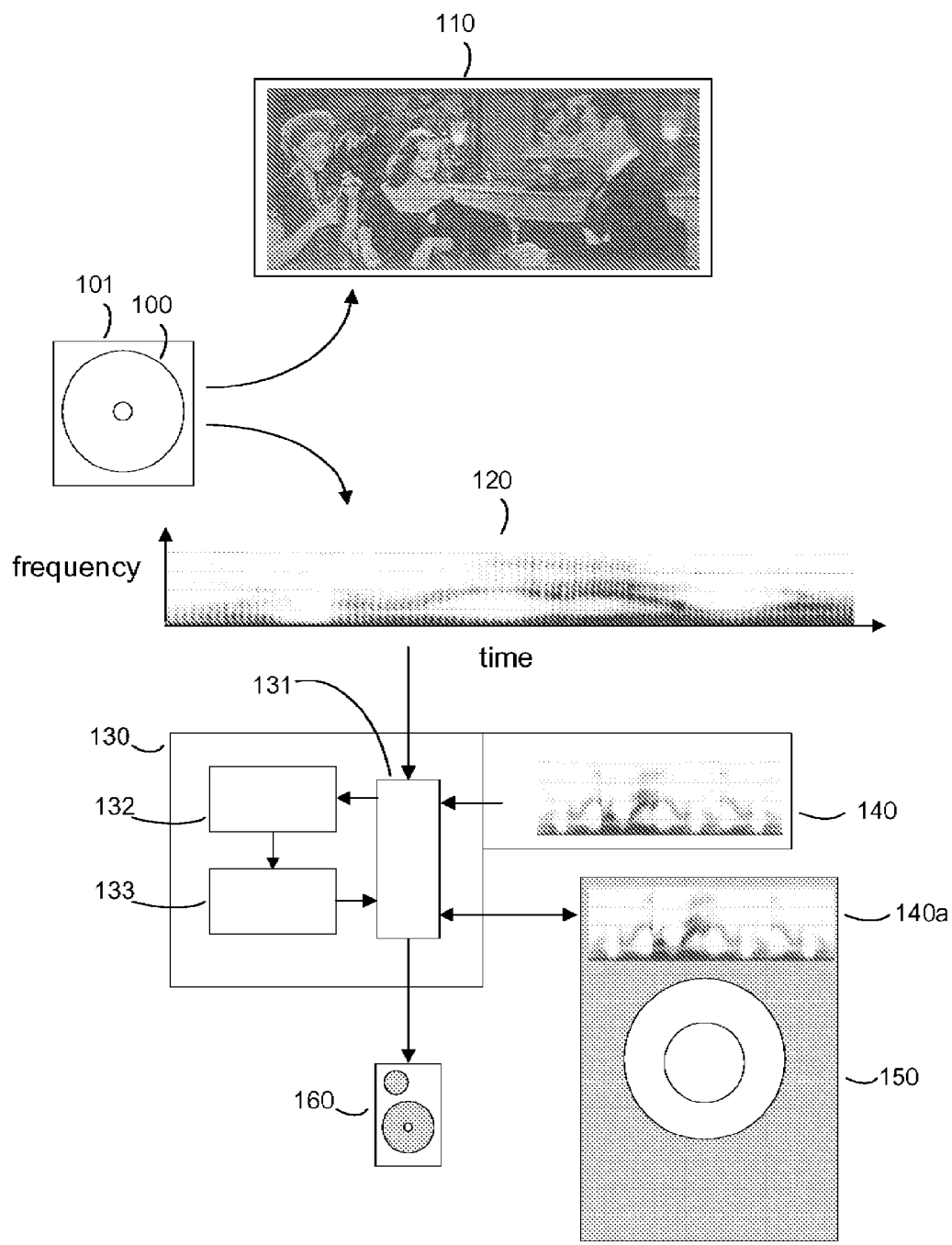
FIG. 1 shows a system architecture diagram that includes an internal embodiment of the apparatus.

FIG. 1 shows a system architecture diagram that includes an internal embodiment of the apparatus. In this configuration audio is detected and the secondary audio track is synchronized internally within a computer. Video source 100, in this case a DVD or high definition DVD is played on DVD player 101. DVD player 101 may be integrated with computer 130 or may be an external DVD player that is coupled with computer 130 electronically, wirelessly or optically to transmit audio to computer 130. The video source is not required to be a DVD and may be an electronic download of a movie or other video broadcast for example. The video may be movie, news program, television series, advertisement or any other video source. In other embodiments, the secondary audio track may be mixed or played wirelessly through a stereo for example without being combined within a sound card. Any method of playing the synchronized audio generated by embodiments of the invention is in keeping with the spirit of the invention.

Video source 100, when played yields video 110 and associated audio track 120, here shown as a sonogram, i.e., a type of spectrogram. In one or more embodiments the secondary audio track is an MP3 that contains commentary, music or other audio and may for example include commentary of a humorous nature. Any other type of audio may be utilized in the secondary audio track, e.g., sound effects. For example, the audio events and secondary audio track or any associated clips are not limited to the spoken word.

Audio track 120 of video source 100 is transmitted to (or played on) computer 130 and arrives at sound card 131. The sound card is sampled by detection module 132 to detect audio events. Audio events that are found are provided to timing module 133 to alter the timing of secondary audio track 140, here also shown as a sonogram. By altering the timing of play of secondary audio track 140, synchronization is maintained by determining the time difference between the audio event and the desired time that that event should occur. The difference is applied by the timing module to alter the play of secondary audio track 140. Audio track 140 may reside on computer 130 or may be held externally as secondary audio track 140a, for example in MP3 player 150 which is controlled by computer 130 to slow down, speed up, advance or delay secondary audio track 140a. Output of the synchronized combined audio occurs at speaker 160 which may be any type of speaker including self contained speakers or headphones for example. Control of the timing of play of secondary audio track 140 or 140a using embodiments of the invention allows for automatic synchronization between the secondary audio track 140 and 140a and audio track 120 of video source 100.

Embodiments of the invention analyze audio track 120 of a video using audio frequency analysis or spectrograms to find distinct audio events from which to ensure synchronization of a secondary audio track. Audio events are not limited to the spoken word and hence voice recognition systems are but one form of audio analyzer that may be utilized with embodiments of the invention. For example, commentary that mocks a character may be played immediately after an audio event, e.g., particular noise in the audio track of a video occurs, such as a door slam. Keeping the secondary audio track in synch with the audio track of the video is performed by periodically searching for distinct audio events in the audio track using detection module 132 and adjusting the timing of the secondary audio track using timing module 133. The timing may be adjusted by advancing or delaying the play or speeding up or slowing down of the secondary audio track. Alternatively, the secondary audio track may be indexed to allow for event driven playback of portions of the secondary audio track after observing particular audio events.

Third party secondary audio tracks may be created by a user or purchased and/or downloaded for example from "RiffTrax.com" for example and then utilized to add external commentary or any other type of audio to a video. Embodiments of the invention allow for bypassing the generation of a "riffed DVD" altogether as the apparatus is capable of synchronizing audio in real-time. Hence use of rented DVDs (or high definition DVDs) without generating a second DVD is thus enabled.

Figure 2:
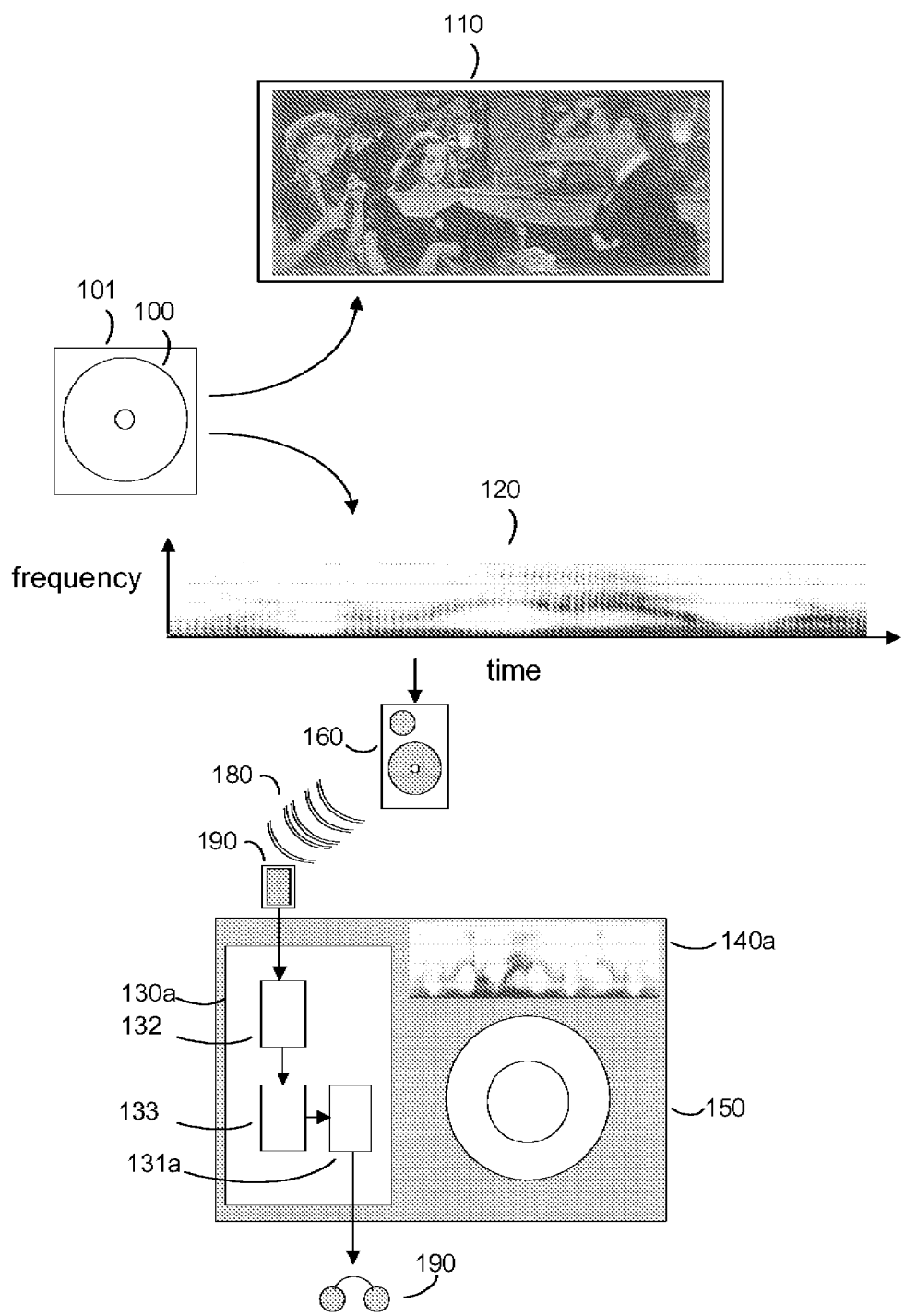
FIG. 2 shows a system architecture diagram that includes an external embodiment of the apparatus.

FIG. 2 shows a system architecture diagram that includes an external embodiment of the apparatus. This configuration is utilized when an audio link as opposed to an electronic or optical audio link is desired. In this configuration, sound 180 emanates from speaker 160 and is utilized to couple audio track 120 to a computer or MP3 player associated with an embodiment of the invention. In this embodiment, microphone 190 is coupled to computing element 130a which may be a general purpose computer or microprocessor in an MP3 player for example. Microphone 190 is utilized to obtain audio track 120 and pass the audio track to detection module 132 and timing module 133 for controlling the timing of secondary audio track 140a and sound module 131a (a type of sound card for example). Output may be transmitted to headphones 190 or to a standard speaker for example.

This for example, allows for a user to take an MP3 player coupled with a microphone to a movie theatre and with earphones, hear a synchronized secondary audio track that greatly enhances a movie and in many cases makes a serious or dramatic movie quite humorous.

Figure 3:
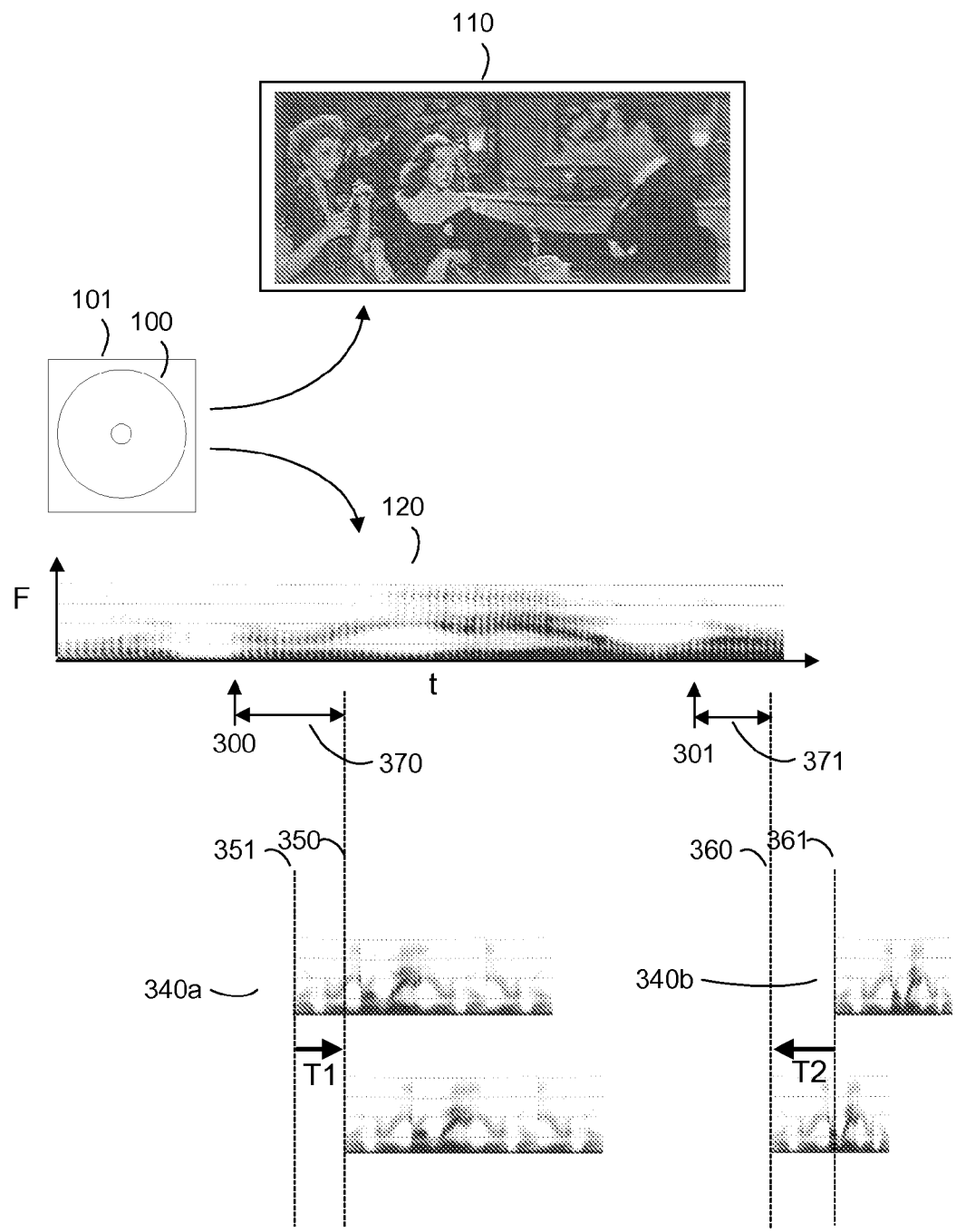
FIG. 3 shows a timing diagram for an audio track of a video source and for a secondary audio track showing advance and delay of portions of the secondary audio track to achieve synchronization.

FIG. 3 shows a timing diagram for an audio track of a video source and for a secondary audio track showing advance and delay of portions of the secondary audio track to achieve synchronization. Embodiments of the invention utilize a timing module 133 (see FIGS. 1, 2) that alters the timing of secondary audio track (that includes clips 340a and 340b of the track). It will be recognized by one skilled in the art that the secondary audio track may include any number of audio clips formed separately or combined as a whole into one secondary audio track.

Audio event times associated with audio events 300 and 301 are detected in audio track 120 of an associated video source 100 by the detection module 132 (see FIGS. 1, 2). The desired audio event times 350 and 360 reside at offsets 370 and 371 respectively. The desired audio event times are compared to the detected audio event times 300 and 301 and the timing of the secondary audio track having clips 340a and 340b is altered based on the time difference to maintain synchronization. The offsets 370 and 371 are compared to the difference between detected audio event times 300 and 301 scheduled audio event times (when the secondary audio clips would play without altering any timing of the currently playing secondary audio track). The timing may be altered by speeding up or slowing down the secondary audio track to drift the secondary audio track back into synchronization or alternatively or in combination, the secondary audio track may be advanced or delayed to achieve synchronization. In one embodiment clip 340a of secondary audio track is delayed by T1 while clip 340b is advanced by T2 to achieve synchronization. In another embodiment play is slowed to allow clip 340a to occur later at time 350 as shown in the bottom offset version of clip 340a, while play is sped up before to allow the occurrence of clip 340b to occur at time 360. In the case of a deleted scene occurring for example, embodiments of the invention may detect that audio events have jumped forward and hence skip ahead in the secondary audio track to regain synchronization.

FIG. 4 shows a desired audio event timing list 400. In one or more embodiments, the timing module may make use of a timing list that details the desired audio events and time offsets thereof. The list may further include general sonogram parameters that detail the general shape of the sonogram, i.e., frequency range and amplitudes in any format that allows for the internal or external detection of audio events internal to a computer or external via a microphone for example. Desired audio event 401 may include an event name, here for example "door slam", with time offset of 10020 and offset to the associated secondary audio clip set to 300. The description of the audio event may be simple or complex so long as the detection module is provided with enough information to selectively detect the audio event. In this simple example, the main frequency range for the event is 200-800 and 1200-1420 with an amplitude of greater than 82. Any units may be utilized with embodiments of the invention. Likewise, audio event 402 includes a shout at time offset 18202 with an offset to the associated audio clip within the secondary audio track of 382. Audio event 403 includes spoken word definition and associated times and offsets. Any number of audio events may be utilized to synchronize a secondary audio track with a video. Use of XML in representing audio events is in keeping with the spirit of the invention.

Figure 5:
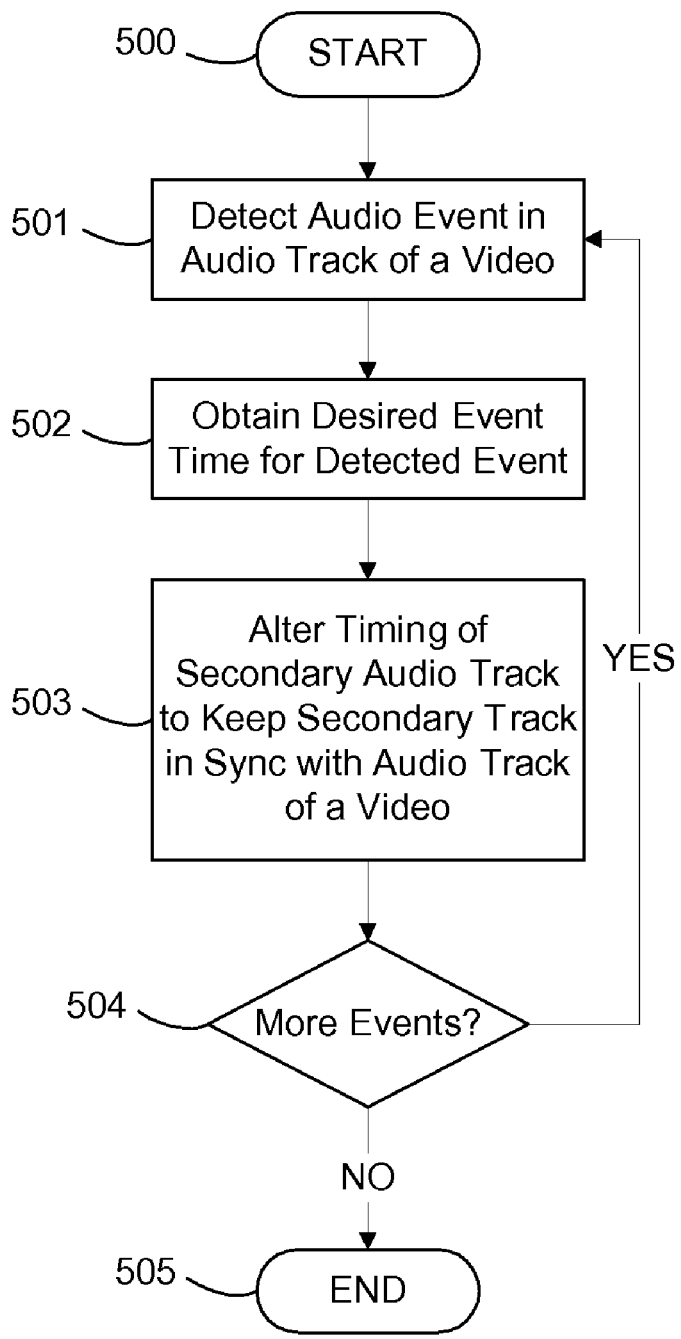
FIG. 5 shows a flowchart for an embodiment of the instant method.

FIG. 5 shows a flowchart for an embodiment of the instant method. The process begins at 500. A first audio event time is detected at 501 for an audio event in an audio track of a video. Any method may be utilized to detect the audio event include frequency analysis of the audio and/or spectrographic analysis or voice recognition software for example. A desired event time for the detected audio event is obtained at 502. The timing of a secondary audio track based on a difference between the first audio event time and the desired event time is altered at 503 with the timing of the secondary audio track adjusted to remain in synchronization with the audio track of the video including the addition of any offsets to secondary audio clip starting times. If there are more audio events to synchronize at determined at 504, then processing proceeds to 501, else processing ends at 505.

While the invention herein disclosed has been described by means of specific embodiments and applications thereof, numerous modifications and variations could be made thereto by those skilled in the art without departing from the scope of the invention set forth in the claims.

What is claimed is:

1. A secondary audio track synchronization apparatus for synchronizing a secondary audio track to an audio track of a video source comprising:
    a detection module searching for distinct audio events that are to be found in a first audio track wherein said distinct audio events are not found in said secondary audio track;
    a timing module;
    a first audio event time of first audio event detected via said detection module wherein said first audio event occurs in an audio track of a video;
    a desired audio event time for said first audio event;
    said timing module altering a timing of a secondary audio track based on a difference between said first audio event time and said desired audio event time wherein said timing of said secondary audio track is adjusted to remain in synchronization with said audio track of said video.

2. The secondary audio track synchronization apparatus of claim 1 wherein said audio event is detected through frequency analysis of said audio track of said video.

3. The secondary audio track synchronization apparatus of claim 1 wherein said video is a DVD.

4. The secondary audio track synchronization apparatus of claim 1 wherein said video is a high definition DVD.

5. The secondary audio track synchronization apparatus of claim 1 wherein said secondary audio track is an MP3.

6. The secondary audio track synchronization apparatus of claim 1 further comprising:
    an audio event list comprising at least one audio event time offset and at least one audio event parameter wherein said at least one audio event parameter is utilized by said detection module to search for said first audio event in said first audio track having said at least one audio event parameter and wherein said timing module utilizing said at least one audio event time offset as said desired audio event time.

7. The secondary audio track synchronization apparatus of claim 1 further comprising an audio card utilized to play said audio track of said video and said secondary audio track simultaneously.

8. A secondary audio track synchronization method for synchronizing a secondary audio track to an audio track of a video source comprising:
    detecting a first audio event time for a first audio event in an audio track of a video by searching for distinct audio events that are to be found in a first audio track wherein said distinct audio events are not found in said secondary audio track;
    obtaining a desired event time for said first audio event;
    altering a timing of a secondary audio track based on a difference between said first audio event time and said desired event time wherein said timing of said secondary audio track is adjusted to remain in synchronization with said audio track of said video.

9. The secondary audio track synchronization method of claim 8 wherein said detecting said audio event occurs through frequency analysis of said audio track of said video.

10. The secondary audio track synchronization method of claim 8 wherein said detecting occurs using an audio track of a video from a DVD.

11. The secondary audio track synchronization method of claim 8 wherein said detecting occurs using an audio track of a video which is playing from a high definition DVD.

12. The secondary audio track synchronization method of claim 8 wherein said altering said secondary audio track occurs using an MP3.

13. The secondary audio track synchronization method of claim 8 further comprising:
    utilizing an audio event list comprising at least one audio event time offset and at least one audio event parameter in searching for said first audio event in said first audio track having said at least one audio event parameter and to utilizing said at least one audio event time as said desired audio event time.

14. The secondary audio track synchronization method of claim 8 further comprising utilizing an audio card to play said audio track of said video and said secondary audio track simultaneously.

* * * * *